July 15, 1958
G. AUFRICHT
2,843,115
COMBINED SPECTACLE FRAME AND NASAL CLAMP
Filed May 20, 1954
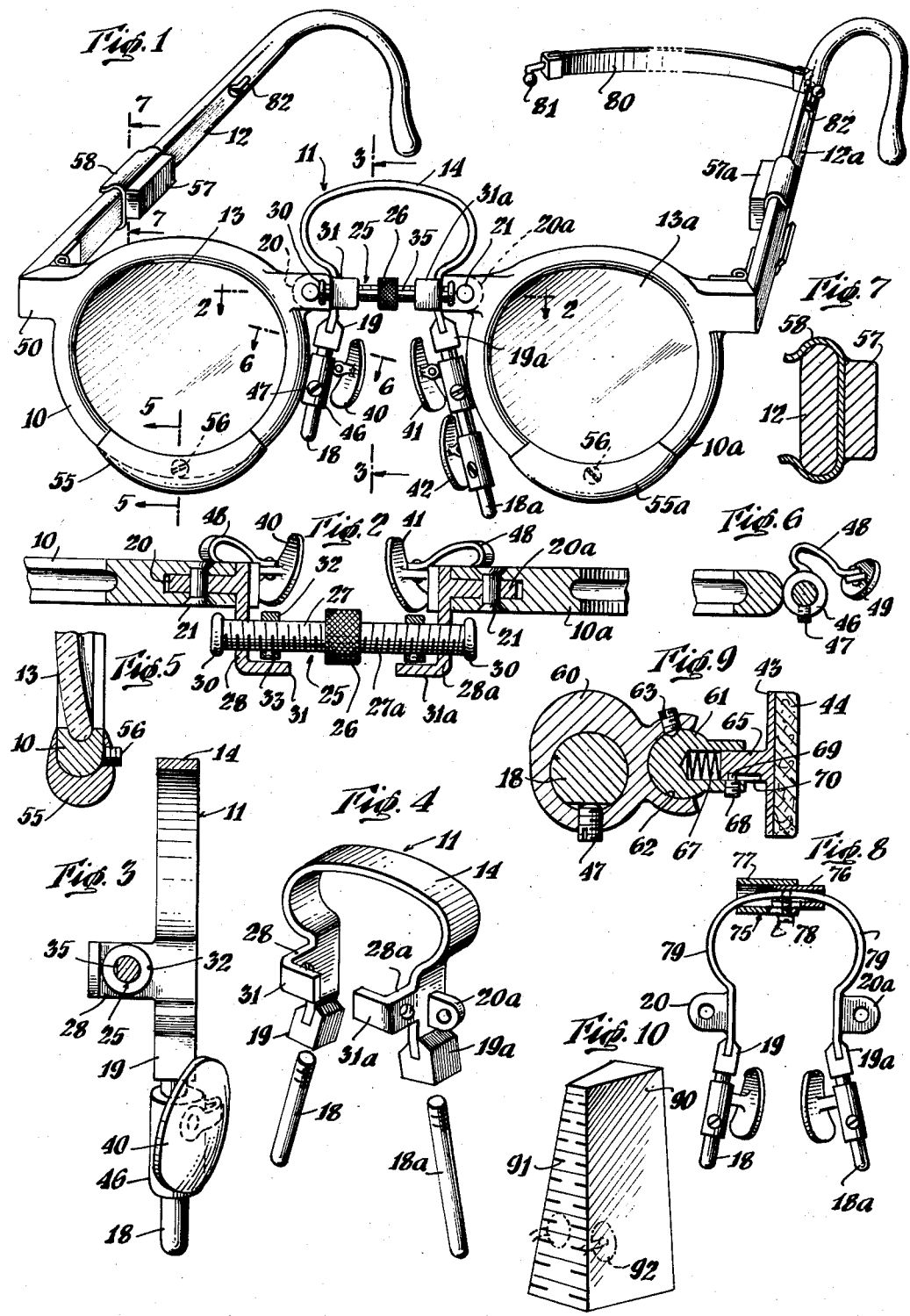

United States Patent Office 2,843,115
Patented July 15, 1958

2,843,115

COMBINED SPECTACLE FRAME AND NASAL CLAMP

Gustave Aufricht, New York, N. Y.

Application May 20, 1954, Serial No. 431,186

11 Claims. (Cl. 128—76)

The present invention concerns a nasal clamp of a combination type including a spectacle frame for supporting the clamp. It is an object of the invention to provide such a device which is of relatively simple construction but which may be readily adjusted and adapted to meet a variety of conditions in the shaping treatment and control of nasal parts including the treatment of injuries and deformities.

The device is adapted to apply a relatively gentle controlled pressure to desired areas including its use for such purposes after planned nasal plastic operations for supporting and training the nasal parts in the desired manner. It may be used in supporting the nasal parts in the treatment and remedy of fractured noses. It may be worn with comfort over long periods of time and is very useful therefore in the correction, shaping, molding and training of the nose and nasal parts in the growing stages of a person.

The clamp embodies the principle of deriving and applying pressures through the incorporation of weights and adjustment and variation of the degree and area of application of the pressure are conveniently accomplished by variation in the location and the relative amount of the weights. Although the device is referred to as a nasal clamp, it will be apparent that it is more precisely a means for applying a selected pressure at selected areas of the nose as distinguished from the principle of a vise or clamp in the general sense.

The device includes spectacle frames which are not greatly different from standard frames and the device as a whole is free of the unattractiveness or disfigurement characteristic of prior nasal clamps. It may include, if desired, prescription type lenses or dark lenses particularly if it is desirable to conceal discolored eye areas.

Various objects and advantages will be made apparent from a consideration of the features of construction and combination of elements which will be exemplified in the specific example illustrated in the drawings and hereinafter described.

In connection with the detailed description, reference should be had to the accompanying drawings in which:

Fig. 1 is a perspective view of a combined spectacle and nasal clamp comprising one specific embodiment of the principles of the invention;

Fig. 2 is a fragmentary horizontal section taken on the line 2—2 of Figure 1;

Fig. 3 is a vertical section taken on the line 3—3 of Figure 1;

Fig. 4 is a perspective view of the main bridge section prior to assembly;

Fig. 5 is a fragmentary detailed section on the line 5—5 of Figure 1 through one of the attached weights;

Fig. 6 is a fragmentary cross sectional view on the line 6—6 of Figure 1;

Fig. 7 is likewise a small section on the line 7—7 of Figure 1;

Fig. 8 is a view of a modified type of bridge section;

Fig. 9 is a cross section showing a modified type of pad supporting means; and,

Fig. 10 is a perspective view of a generally pyramidal shaped block illustrating a device which may be conveniently employed in the setting of the bridge and nose clamp elements.

In the form of the invention shown in Figure 1 the device embodies a frame including lens supporting portions 10 and 10a connected by a bridge section indicated generally at 11 and having outer temple pieces 12 and 12a. The lens supporting portions 10 and 10a are also referred to herein as bow parts. The spectacle frame portion may vary as to detailed construction and shape and material. It may, for example, be of plastic material or, since the pressure to be derived from the frame depends upon the embodiment of a certain amount of weight, the frame may be made of heavier material such as a metal, and also may be made of relatively large proportions. The lenses 13 and 13a may vary as to type, depending on circumstances and may, for example, be plain glass or prescription lenses or dark lenses.

As shown in Figures 1 and 4 the intermediate bridge section embodies an upper arch-shaped part 14 which may be of metal spring material and has depending leg portions including suitably shaped rod parts 18 and 18a which may be removably secured in the bridge section, and for this purpose the bridge section has a pair of blocks 19 and 19a secured to the lower ends of the legs of the arch-shaped member by welding or other suitable means, the blocks having slots adapted to receive the lower ends of the arch-shaped bridge part 14 and the rods 18 and 18a being screw threaded into the respective blocks. The rod extensions 18 and 18a are adapted to support nose engaging pads, as will be described more fully below.

The lens encircling portions 10 and 10a of the spectacle frame part may be integral with the bridge or suitably secured thereto. If the particular embodiment of the invention the lens frame parts are secured to the bridge section through the medium of laterally extending lugs 20 and 20a received in slots in the respective parts 10 and 10a and secured in place by suitable bolts or rivets 21.

The major adjustment as to the spacing between the pads carried by the bridge section is effected through a screw setting means which includes a rotatable screw member 25 having a middle knurled finger portion 26 and extending screw parts 27 and 27a which are threaded in opposite directions or hand. The screw ends are threaded through openings in the forwardly projecting bracket portions 28 and 28a of the member 14 and rotation of the screw opens or closes the spacing across the nose area. Preferably the outer ends of the screw parts 27 and 27a are provided with means to prevent the wearer from rotating the screw out of the holes once the parts have been assembled and for this purpose the screw ends may be peened over as indicated at 30. For improved appearance the fingers 28, 28a may each have a bent over portion extending toward each other as indicated at 31 and 31a. Normally the surgeon will set the spacing and make the desired adjustments. The patient may, of course, thereafter make some adjustments but in order to insure that the patient does not close the bridge spacing beyond a certain point, the device is provided with positive stop means which may be set by the surgeon comprising a nut 32 rotatable upon the screw 27 and adapted to be locked in adjusted position by a set screw 33. One such locking nut is sufficient, but for symmetrical purposes similar nuts may be provided on each of the screw ends. In order to insure secure fastening of the lock nut 32 the screw parts 27, 27a are provided with one or more longitudinally extending flatted areas such as that indicated at 35 in Figures 1 and 3.

As described above, the bridge section is provided with depending extensions 18 and 18a adapted to have mounted thereon nose engaging pads which may be of a shape and character and positioned in accordance with the desired effect and treatment. In Figure 1 three such pads are shown at 40, 41 and 42. The individual pads may vary in construction, but usually will embody a rigid backing portion such as that shown at 43 in Figure 9 with a facing 44 of resilient material such as felt or rubber. The pads are secured to a sleeve part indicated at 46 in Figures 1 and 6, and are vertically and rotatably adjustable on the supporting rods 18 or 18a and adapted to be secured in adjusted position by a set screw 47. The pads are mounted on the sleeve portions 46 by suitable means which in Figures 1 and 6 include a metal strip 48 integral with or welded to the sleeve 46 and secured to the pad by a joint 49 which may be rigid or provide a free pivot for automatic self-adjustment of the pad on the pivot to engage the nose portion flatwise. In addition to the adjustability of the supporting sleeve 46 on the rod extension, further adjustment may be made through bending of the strip 48 in a manner commonly employed by opticians, or joint means may be embodied therein as will be described in connection with the modification of Figure 9.

As described above the frame embodies means for applying the pressure to any area of the nose desired. Where a symmetrical opposed pressure is desired, the pad 42 would be omitted and a shorter rod 18a be substituted similar in appearance to the rod 18. On the other hand, the areas to which pressure is applied may be different on the opposite sides of the nose or the pad may be omitted altogether on one side. In the latter case an auxiliary attachment may be embodied, if necessary, adapted to bear against the side of the head of the wearer and supply the required counteracting support or pressure. Such an attachment may comprise a part adapted to be clamped on the temple piece or to the temple supporting lug such as that indicated at 50.

An important feature of the present device is the embodiment of auxiliary selectively removable and adjustable weights for varying the degree of pressure exerted on the desired areas. The location and precise character of the weights may vary, but conveniently they may comprise arc-shaped weights such as those indicated at 55 and 55a adapted to be secured to the lens encircling parts 10 and 10a respectively and secured in adjusted position by means of a set screw such as that shown at 56 in Figure 5, or the weights may be held in place by spring clips. As the weights 55, 55a are applied in Figure 1 they are located at the lowermost points of the respective frame parts 10 and 10a, but it will be apparent that they may be slid around to other positions on the respective frame parts. The weights 55 and 55a may vary not only as to size but as to their specific gravity and, where it is important, may be made of a very heavy metal for example. Additional weights may be applied on the temple parts 12 and 12a, as shown for example at 57 and 57a, and such weights are adapted to serve the additional function where needed of counter-balancing the weights 55 and 55a. In other words, if there is a tendency of the device to rock forward, the weight 57 or 57a, or both, may be employed to counteract that tendency. In this connection it will be noted that the weights 57 and 57a are not only easily applied through the spring clip portions 58 but they may be slid along to different positions on the temple part 12 or 12a.

The above comprises illustrative means for applying auxiliary weights. The desired weight may be achieved in other manners. For example, suitable weights may be embodied in the support for the pads as indicated by the enlarged sleeve portion 60 in Figure 9. This figure also illustrates a modified form of means for adjusting the position of the pad by the embodiment of a universal joint connection instead of the bendable strip 48. The universal joint comprises a ball part 61 received in a socket portion 62 spherically shaped internally with the outer edge being compressed around the ball 57 after assembly. The universal joint is adapted to be secured in an adjusted position by means of a set screw 63. The support for the pad may also embody spring cushioning means such as that shown in Figure 9 comprising a stem 65 extending from the pad backing 43 and received in a socket in the ball part 61 and normally urged outwardly by a coil compression spring 67. The outer movement of the stem 65 is limited by means of a set screw 68 provided with an extension 69 of reduced diameter received in a slot 70 of the stem 65.

Modifications of various other parts of the frame may also be employed. Figure 8 shows a modified form of bridge section in which the screw adjusting means 25 is omitted and variation in the leg spacing is accomplished through an adjustment means 75 comprising two oval shaped telescoping sleeve parts 76 and 77 formed around the bridge section and held in adjusted position by a set screw 78 which extends through a slot in each of the two sleeves and is threaded into the bridge member 79. The bridge section may be of spring material and sliding the sleeves outwardly from each other forces and holds apart the depending leg portions of the bridge.

To insure firm holding of the frame on the wearer it may be provided with an elastic band 80 adapted to extend around the head of the wearer. The band may be employed or not as desired, and for ready attachment the ends of the band are provided with metal terminal clips including enlarged ball portions 81 adapted to be inserted in key-hole type openings 82 in the respective temple parts 12 and 12a.

With the adjustability described and the ability to vary the weights, the nasal clamp may be adapted to meet a great variety of conditions and to apply a constant pressure of selected degree to any needed area of the parts of the nose. Normally the initial adjustment and selection of conditions will be made by a supervisor such as a surgeon. For this purpose, with the type of clamp concerned, a standard for assisting in the setting thereof such as that shown in Figure 10 may conveniently be employed. The standard comprises a truncated pyramidal block 90 which tapers both vertically and from front to back simulating in general the average human nose. The surgeon measures the region across the nose to which pressure is to be applied as by the use of calipers and selects and assembles the pads to be employed. By use of the calipers or by reference to graduation marks such as those indicated at 91, he determines the position on the standard 90 corresponding to the measured dimension, and applies the clamp and adjusts it to that position as illustrated in the broken line pattern 92 of the pads in Figure 10.

This patent application contains and claims subject matter disclosed in part but not claimed in my prior application Serial No. 423,443, filed April 15, 1954.

It will be understood that various changes may be made in the detailed elements or arrangements of the combined article above described and shown in the drawings without departing from the scope of the invention as defined by the claims, and it is intended that all matter contained therein shall be interpreted as illustrative of the principles of the invention.

I claim:

1. A nasal clamp having in combination a spectacle type frame including a temple part and a bow part at each side and a bridge means connecting said bow parts, one or more nose engaging pads supported on said bridge means, and an auxiliary weight with means removably securing it to one of said parts said means providing for securing the weight in selectable positions to vary the pressure exerted on a predetermined pad in accordance with the position of said weight.

2. A nasal clamp having in combination a spectacle frame including a bridge means and temple parts, nose engaging pads mounted on said bridge means, the mounting embodying means for adjusting said pads to vary the location of the area of contact, and means mounting auxiliary weights on said frame in selectable different positions to vary the character and amount of pressure exertable upon the nose by the respective said pads.

3. A nasal clamp having in combination a spectacle frame including bridge means having depending spaced leg parts, means embodied in said bridge means for adjusting the spacing between said leg parts, opposed nose pads adjustably mounted on said leg parts, auxiliary weights removably mounted on said frame and adapted to be moved to selectable different positions and thereby in association with the adjustability of the pads to vary the character position and amount of pressure exertable upon the nose areas by the respective said pads.

4. A nasal clamp having in combination a spectacle frame including bow and temple parts and a bridge means, nose engaging pads mounted on said bridge means, and an auxiliary weight removably and adjustably mounted on said bow parts.

5. A nasal clamp having in combination a spectacle frame including bow parts and temple parts and a bridge means having depending legs, nose engaging pads mounted on said legs, means for adjusting the bridge means to vary the spacing between said pads, and weights mounted on said bow parts said weights being removable and adjustable as to position and adapted to cause the exertion of selective added pressure by said pads on the nose parts.

6. A nasal clamp having in combination a spectacle frame including lens enclosing bow parts and temple parts and a bridge means having depending legs, nose engaging pads mounted on said legs, one or more weights removably secured to the exterior of said bow parts outside the normal lens area each adapted to increase the pressure of the nose pad on the corresponding side.

7. A nasal clamp having in combination a spectacle frame including lens enclosing bow parts and temple parts and a bridge means, nose engaging pads mounted on said bridge means, and an auxiliary weight removably secured to the exterior of said bow parts, said weight being arc shaped and conforming substantially to the circumferential outline of the corresponding lens encircling portion of the bow but extending for only a portion of the circumference.

8. A nasal clamp having in combination a spectacle frame including lens enclosing bow parts and temple parts and a bridge means, nose engaging pads mounted on said bridge means the mounting embodying means for adjusting the position of the respective pad, an auxiliary weight mounted on the exterior of said bow parts, clamp means removably securing the weight to the bow part, said weight being arc shaped and conforming substantially to the circumferential outline of the corresponding lens encircling portion of the bow part and located substantially outside the area of the corresponding lens, but extending for a minor portion only of the circumference of the bow part.

9. A nasal clamp having in combination a spectacle frame including bow and temple parts and a bridge means having depending legs, opposed nose engaging pad means on said legs, a weight and means removably mounting it on said bow part, and a second counter balancing weight and means removably mounting it on said temple parts.

10. A nasal clamp having in combination a spectacle type frame including bow parts and temple parts and a bridge means, one or more nose engaging pads mounted on said bridge means, an auxiliary weight removably secured to the exterior of one of said bow parts to one side of said bridge means outside the normal lens area adapted to increase the normal pressure of a nose pad located at the corresponding said side.

11. A nasal clamp having in combination a spectacle type frame including bow parts and temple parts and a bridge means, one or more nose engaging pads mounted on said bridge means, and an auxiliary weight removably secured to the exterior of one of said bow parts, said weight being arc shaped and conforming substantially to the circumferential outline of the corresponding portion of the bow part but extending for only a portion of the circumference.

References Cited in the file of this patent

UNITED STATES PATENTS

| 541,959 | Borsch | July 2, 1895 |
| 2,057,288 | Bailey | Oct. 13, 1936 |
| 2,427,465 | La Vista | Sept. 16, 1947 |
| 2,586,851 | Monro et al. | Feb. 26, 1952 |

FOREIGN PATENTS

| 915,421 | France | July 22, 1946 |